United States Patent
Iwatsuka et al.

(10) Patent No.: US 12,118,383 B2
(45) Date of Patent: Oct. 15, 2024

(54) SYSTEM MIGRATION SUPPORT APPARATUS, SYSTEM MIGRATION SUPPORT METHOD AND PROGRAM TO ENHANCE REPRODUCIBILITY OF MIGRATION DESTINATION SYSTEM

(71) Applicant: NIPPON TELEGRAPH AND TELEPHONE CORPORATION, Tokyo (JP)

(72) Inventors: Takuya Iwatsuka, Tokyo (JP); Seiichiro Mochida, Tokyo (JP); Akira Kanamaru, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 737 days.

(21) Appl. No.: 17/283,515

(22) PCT Filed: Sep. 27, 2019

(86) PCT No.: PCT/JP2019/038203
§ 371 (c)(1),
(2) Date: Apr. 7, 2021

(87) PCT Pub. No.: WO2020/075532
PCT Pub. Date: Apr. 16, 2020

(65) Prior Publication Data
US 2021/0389977 A1    Dec. 16, 2021

(30) Foreign Application Priority Data
Oct. 9, 2018 (JP) ................. 2018-191169

(51) Int. Cl.
*G06F 9/48* (2006.01)
*G06F 9/54* (2006.01)

(52) U.S. Cl.
CPC ............ *G06F 9/4875* (2013.01); *G06F 9/541* (2013.01)

(58) Field of Classification Search
CPC ................................. G06F 9/4875; G06F 9/541
See application file for complete search history.

(56) References Cited

U.S. PATENT DOCUMENTS

2018/0167278 A1* 6/2018 Holmes ................. G06F 9/5072

OTHER PUBLICATIONS

Fleurey et al. (2007) "Model-Driven Engineering for Software Migration in a Large Industrial Context," MoDELS'07, Nashville, TN, USA <inria-00477566>.

(Continued)

*Primary Examiner* — Wissam Rashid (57) ABSTRACT

A system migration support apparatus enhances reproducibility of operation of a migration source system in a migration destination system, by including a first generation unit generating first data showing information about operation of a migration source system in a form dependent on an implementation technique of the migration source system, based on materials of the migration source system; a second generation unit generating second data showing the information about the operation in a form independent of a particular implementation technique, based on the first data, and generating first correspondence information showing correspondence relationships between portions of the first data and portions of the second data; and a third generation unit identifying the portions of the first data corresponding to the portions of the second data, referring to the first correspondence information, and generating third data showing the information about the operation in a form dependent on an implementation technique of a migration destination system, based on the identified portions.

17 Claims, 8 Drawing Sheets

(56) References Cited

OTHER PUBLICATIONS

Cosentino et al. (2012) "A Model Driven Reverse Engineering Framework for Extracting Business Rules out of a Java Application," RuleML, Aug. 2012, Montpellier, France. hal-00755010.

* cited by examiner

SYSTEM MIGRATION SUPPORT APPARATUS, SYSTEM MIGRATION SUPPORT METHOD AND PROGRAM TO ENHANCE REPRODUCIBILITY OF MIGRATION DESTINATION SYSTEM

CROSS-REFERENCE TO RELATED APPLICATIONS

This application is a U.S. 371 Application of International Patent Application No. PCT/JP2019/038203, filed on 27 Sep. 2019, which application claims priority to and the benefit of JP Application No. 2018-191169, filed on 9 Oct. 2018, the disclosures of which are hereby incorporated herein by reference in their entireties.

TECHNICAL FIELD

The present invention relates to a system migration support apparatus, a system migration support method and a program.

BACKGROUND ART

For a computer system such as a web system, a method called model-driven migration is known as a technique for implementing a new system by an implementation technique different from an implementation technique of an old system based on materials of the old system (Non-Patent Literature 1).

Figure 1:
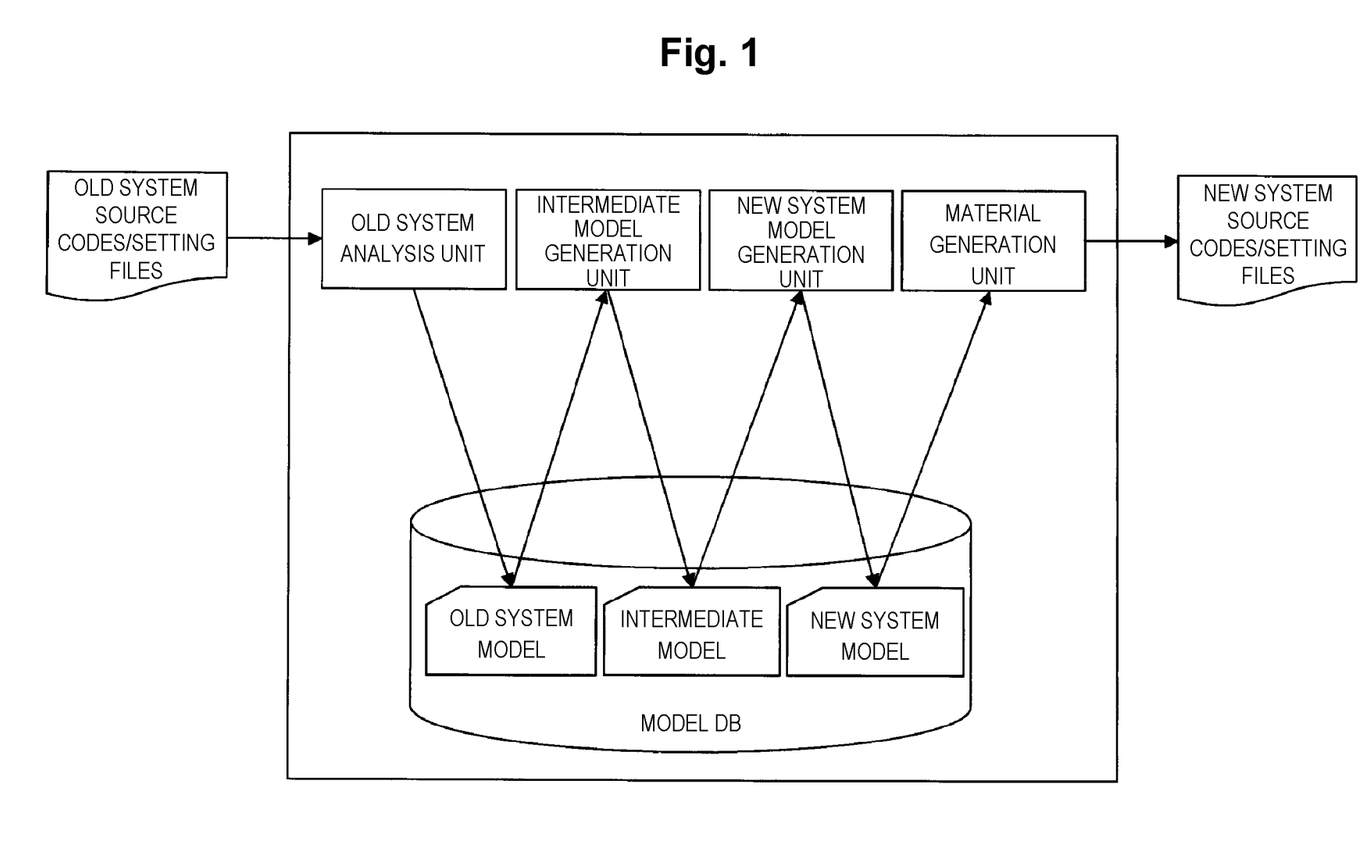
FIG. 1 is a diagram for illustrating a conventional technique.

FIG. 1 is a diagram for illustrating a conventional technique. In the conventional technique, first, a model specific to an implementation technique of an old system is mechanically generated, with materials such as source codes and setting files of the old system as an input. After the generated model is converted to a generic intermediate model independent of a particular implementation technique, the intermediate model is converted to a model specific to an implementation technique of a new system. Lastly, source codes of the new system are generated from the model specific to the implementation technique of the new system. The generic intermediate model independent of a particular implementation technique includes a static data structure, algorithms of processes to be executed, a GUI and screen transitions.

CITATION LIST

Non-Patent Literature

Non-Patent Literature 1: Franck Fleurey, Erwan Breton, Benoit Baudry, Alain Nicolas, Jean-Marc Jezequel. Model-Driven Engineering for Software Migration in a Large Industrial Context. MoDELS'07, 2007, Nashville, TN, USA, United States. 2007.

SUMMARY OF THE INVENTION

Technical Problem

In the conventional technique, conversion via a generic intermediate model independent of an implementation technique is performed. In this process, configurations of source codes and details of operation that are dependent on an implementation technique of an old system are lost.

If the old system is implemented, using complicated functions and high-function external libraries and frameworks dependent on specifications of a programming language, it becomes difficult to reproduce the operation of the old system with high accuracy at the time of migration to a new system by implementation details being lost.

For example, in screen transition of a web system, details about how the system behaves in response to screen transition beyond expectation due to direct access to a particular screen, reloading of a screen or use of a return button of a browser depend on frameworks and libraries used for implementation, and it is difficult to express the details as a generic intermediate model. In such a case, in the conventional technique, there is a possibility that unintended behavior difference occurs between operations of the old system and the new system.

The present invention has been made in view of the above point, and an object is to enhance reproducibility of operation of a migration source system in a migration destination system.

Means for Solving the Problem

Therefore, in order to solve the above problem a system migration support apparatus includes: a first generation unit generating first data showing information about operation of a migration source system in a form dependent on an implementation technique of the migration source system, based on materials of the migration source system; a second generation unit generating second data showing the information about the operation in a form independent of a particular implementation technique, based on the first data, and generating first correspondence information showing correspondence relationships between portions of the first data and portions of the second data; and a third generation unit identifying the portions of the first data corresponding to the portions of the second data, referring to the first correspondence information, and generating third data showing the information about the operation in a form dependent on an implementation technique of a migration destination system, based on the identified portions.

Effects of the Invention

It is possible to enhance reproducibility of operation of a migration source system in a migration destination system.

DESCRIPTION OF EMBODIMENT

Figure 2:
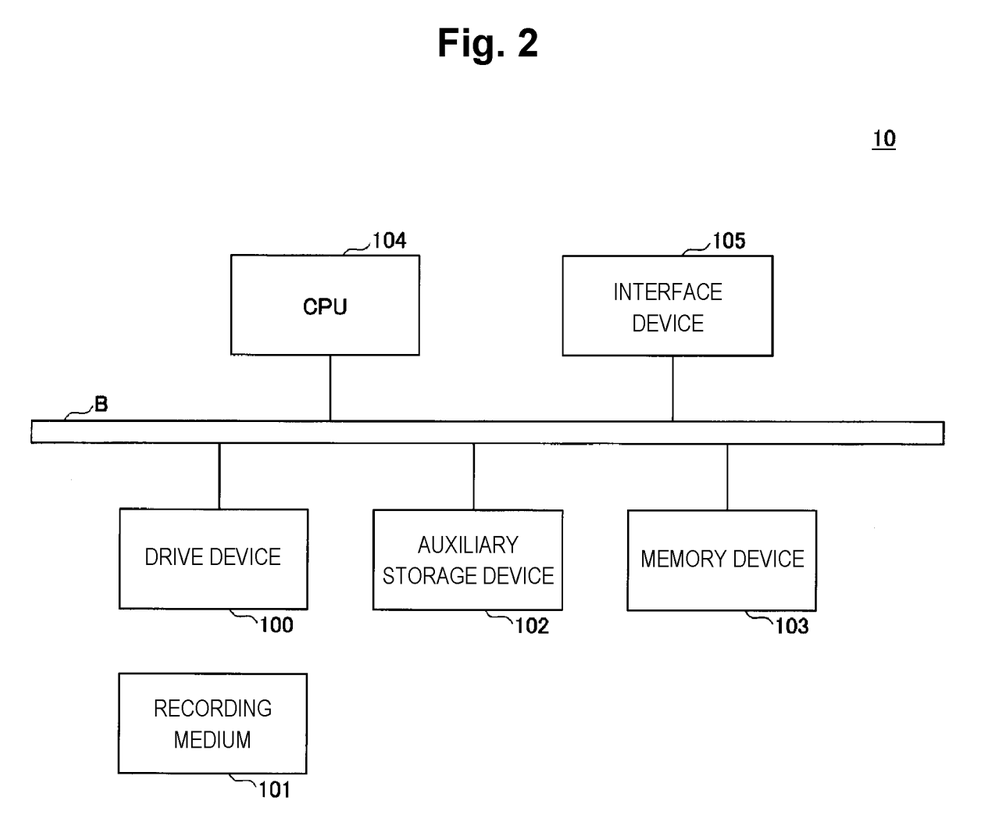
FIG. 2 is a diagram showing a hardware configuration example of a system migration support apparatus 10 in an embodiment of the present invention.

An embodiment of the present invention will be described below based on drawings. FIG. 2 is a diagram showing a hardware configuration example of a system migration support apparatus 10 in the embodiment of the present invention. The system migration support apparatus 10 in FIG. 2 is a computer having a drive device 100, an auxiliary storage device 102, a memory device 103, a CPU 104, an interface device 105 and the like that are mutually connected via a bus B.

A program that realizes processes in the system migration support apparatus 10 is provided by a recording medium 101 such as a CD-ROM. When the recording medium 101 that stores the program is set in the drive device 100, the program is installed into the auxiliary storage device 102 from the recording medium 101 via the drive device 100. However, installation of the program is not necessarily required to be performed from the recording medium 101. The program may be downloaded from another computer via a network. The auxiliary storage device 102 stores the installed program and stores necessary files, data and the like.

When an instruction to launch the program is given, the memory device 103 reads out the program from the auxiliary storage device 102 and stores the program. The CPU 104 executes functions related to the system migration support apparatus 10 according to the program stored in the memory device 103. The interface device 105 is used as an interface for connecting to a network.

Figure 3:
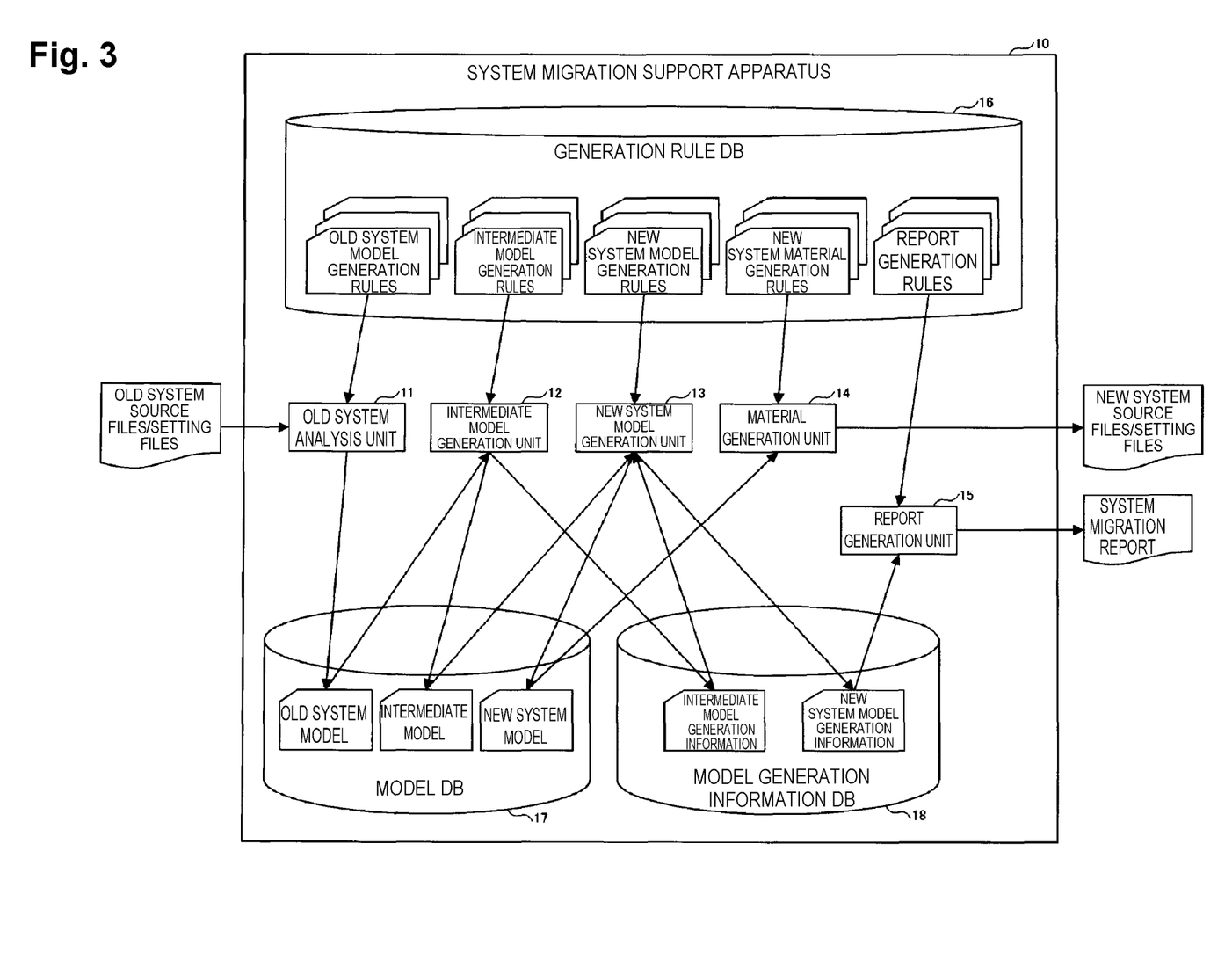
FIG. 3 is a diagram showing a functional configuration example of the system migration support apparatus 10 in the embodiment of the present invention.

FIG. 3 is a diagram showing a functional configuration example of the system migration support apparatus 10 in the embodiment of the present invention. In FIG. 3, the system migration support apparatus 10 has an old system analysis unit 11, an intermediate model generation unit 12, a new system model generation unit 13, a material generation unit 14, a report generation unit 15 and the like. These units are realized by processes that one or more programs installed in the system migration support apparatus 10 cause the CPU 104 to execute. The system migration support apparatus 10 uses databases (DBs) such as a generation rule DB 16, a model DB 17 and a model generation information DB 18. These DBs can be realized, for example, using a storage device or the like connectable to the auxiliary storage device 102 or the system migration support apparatus 10 via a network.

The old system analysis unit 11 generates, with materials of an old system as an input, an "old system model" based on the materials and stores the generated old system model into the model DB 17. Here, the materials of the old system refers to source code files (hereinafter referred to as "source files"), setting files and the like. Further, the old system model refers to data in which information about operation of the old system is shown in a form dependent on the implementation technique of the old system. Here, the operation of the old system refers to processes executed by the old system. Here, the old system is, for example, a computer system such as a web system and refers to a system to be a migration source relative to a new system to be a migration destination (hereinafter referred to as a "new system"). Note that a generation method (generation rules) for the old system model is defined beforehand in a plurality of old system model generation rules stored in the generation rule DB 16. In other words, the old system analysis unit 11 applies each old system model generation rule to the source files and setting files of the old system model to generate the old system model.

The intermediate model generation unit 12 generates an "intermediate model" based on the old system model and stores the generated intermediate model into the model DB 17. Here, the intermediate model refers to data in which the information about the operation of the old system is shown in a generic form independent of a particular implementation technique. Here, the information about the operation of the old system refers to a static data structure, algorithms of processes to be executed, a GUI (graphical user interface), screen transitions and the like in the old system. The intermediate model generation unit 12 also generates correspondence information showing correspondence relationships between portions of the old system model and portions of the intermediate model (hereinafter referred to as "intermediate model generation information") together with the intermediate model and stores the generated intermediate model generation information into the model generation information DB 18. Note that generation methods (generation rules) for the intermediate model and the intermediate model generation information are defined beforehand in a plurality of intermediate model generation rules stored in the generation rule DB 16. In other words, the intermediate model generation unit 12 applies each intermediate model generation rule to the old system model to generate the intermediate model and the intermediate model generation information.

The new system model generation unit 13 refers to the intermediate model generation information to identify the portions of the old system model corresponding to the portions of the intermediate model. Then, the new system model generation unit 13 generates a new system model based on the identified portions and stores the generated new system model into the model DB 17. Here, the new system model refers to data in which the information about the operation of the old system is shown in a form that a configuration of the new system, a used API and the like are dependent on the implementation technique of the new system. The new system model generation unit 13 also generates correspondence information showing correspondence relationships between the portions of the intermediate model and portions of the new system model (hereinafter referred to as "new system model generation information") together with the new system model and stores the generated new system model generation information into the model generation information DB 18. Note that a generation method (generation rules) for the new system model and the new system model generation information is defined beforehand in a plurality of new system model generation rules stored in the generation rule DB 16. In other words, the new system model generation unit 13 applies each new system model generation rule to the intermediate model and the intermediate model generation information to generate the new system model and the new system model generation information.

The material generation unit 14 applies new system material generation rules stored in the generation rule DB 16 to the new system model to generate materials (source files, setting files and the like) of the new system.

The report generation unit 15 generates information including a correspondence relationship between the old system and the new system and the like (hereinafter referred to as a "report") that assists at the time of manually performing complementary work for the materials of the new system generated by the material generation unit 14, based on the new system model generation information and the intermediate model generation information. Note that a generation method (generation rules) for the report is defined beforehand in a plurality of report generation rules stored in the generation rule DB 16. In other words, the report generation unit 15 applies each report generation rule to the new system model generation information and the intermediate model generation information to generate the report.

Figure 4:
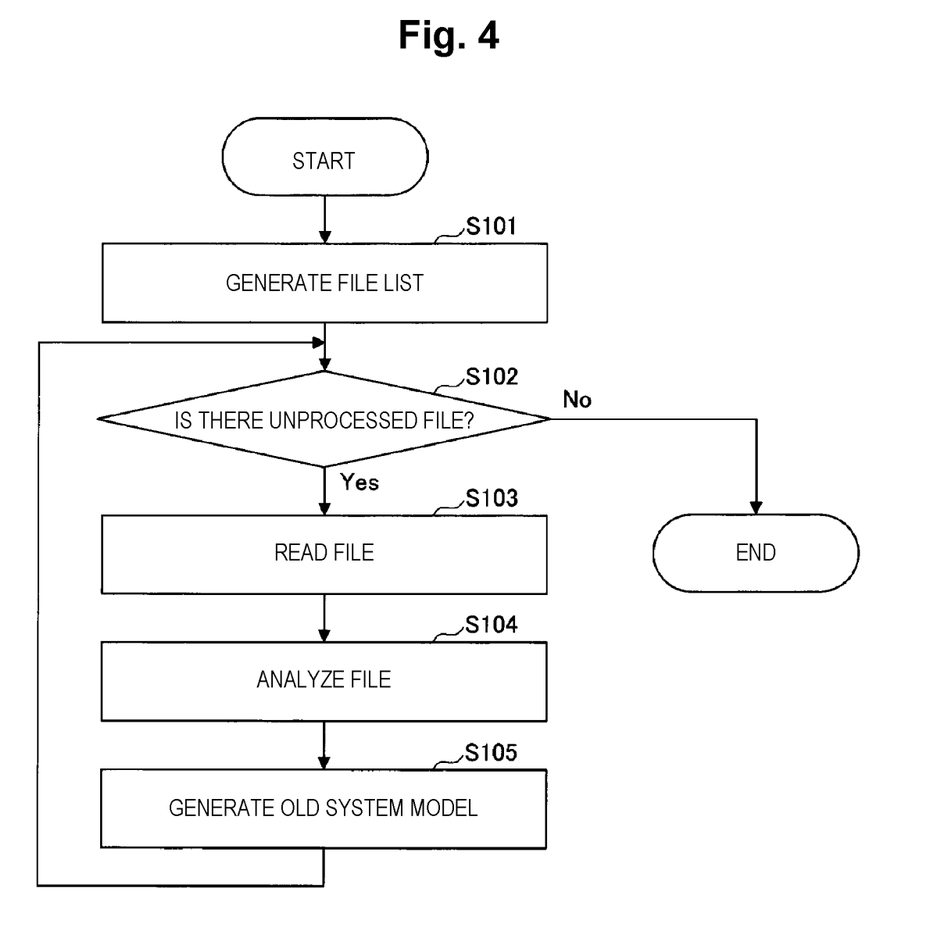
FIG. 4 is a flowchart for illustrating an example of a processing procedure executed by an old system analysis unit 11.

A processing procedure execute by the system migration support apparatus 10 will be described below. FIG. 4 is a flowchart for illustrating an example of a processing procedure executed by the old system analysis unit 11.

At step S101, the old system analysis unit 11 inputs the source files and setting files of the old system and generates a list of these files (hereinafter referred to as a "file list").

Next, the old system analysis unit 11 determines whether or not step S103 and subsequent steps have been executed for all the files included in the generated file list (S102). If there are files for which step S103 and the subsequent steps have not been executed (S102: Yes), the old system analysis unit 11 reads, with one file (hereinafter referred as a "target file") among the unprocessed files as a processing target, the content of the target file into the memory device 103 (S103).

Next, the old system analysis unit 11 analyzes the content of the target file (S104). Specifically, the old system analysis unit 11 performs lexical analysis and parsing according to the file type (such as source file and setting file) for the target file and converts the content of the target file to tree-structured data suitable for processing by a calculator.

Next, the old system analysis unit 11 applies the plurality of old system model generation rules to the tree-structured data to generate an old system model, and stores the old system model into the model DB 17 (S105).

The old system model generation rules are data in which rules as shown below are defined. Here, the rules as shown below are rules for classifying source files and setting files according to conditions as shown below and generating a model (data) holding parameters specified for each classification as the old system model. Here, the conditions as shown below are conditions such as a file type, commonality among character strings included in file names, commonality among character strings constituting paths on the system, and whether a particular API is used or not. The old system model generation rules are created by a person who understands the implementation of the old system. For example, the old system model generation rules may be created for each of the classifications. It is because there is a possibility that a parameter configuration and a parameter expression form differ for each classification and that a data format of (a portion of) the generated old system model differs for each classification that parameters are specified for each classification. In other words, the conditions, such as the file type, the commonality among character strings included in file names, the commonality among character strings constituting paths on the system, and whether a particular API is used or not, which are described above, are examples of a condition for distinguishing differences between data formats (parameter formats) at the time of conversion to the old system model. If another condition is appropriate from such a point of view, source file groups and setting file groups may be classified based on the other condition. Note that the old system model generation rules are dependent on an implementation technique such as a programming language and frameworks used for implementation of the old system. Therefore, information dependent on the implementation technique, such as information about types (data) dependent on a particular programming language and a name of an API dependent on a particular library, can be included in parameters that the old system model has.

When steps S103 to S105 described above have been executed for all the files included in the file list (S102: No), the old system analysis unit 11 ends the process.

Figure 5:
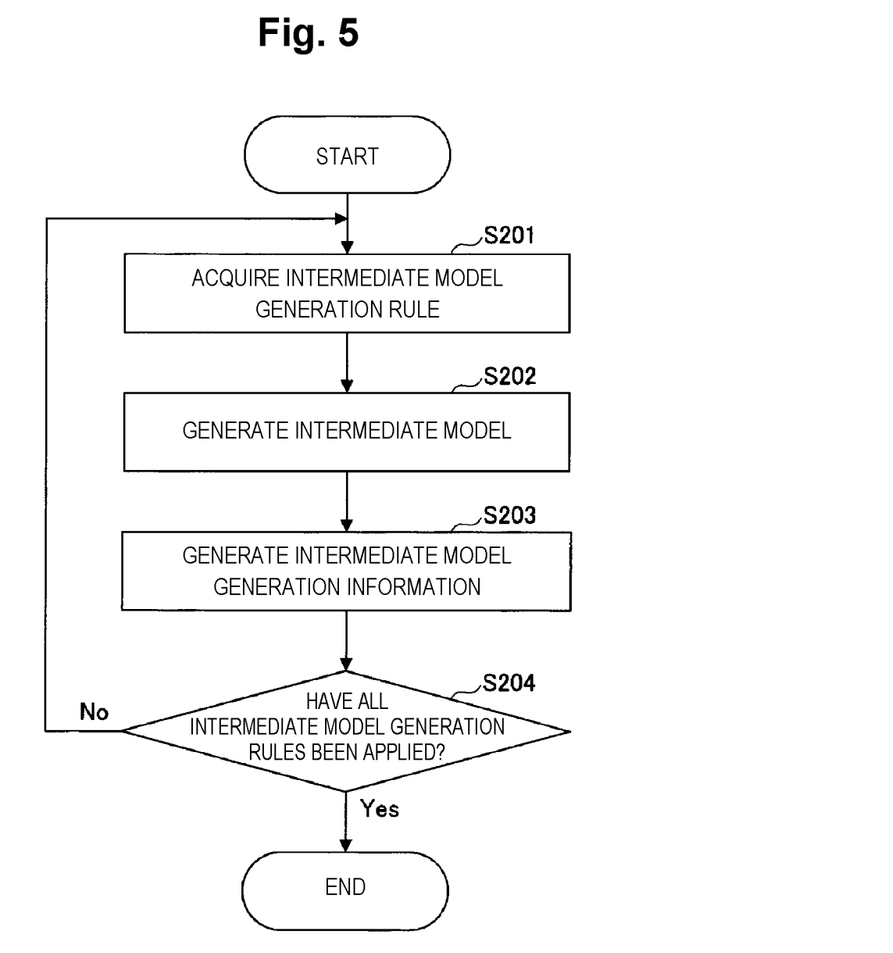
FIG. 5 is a flowchart for illustrating an example of a processing procedure executed by an intermediate model generation unit 12.

FIG. 5 is a flowchart for illustrating an example of a processing procedure executed by the intermediate model generation unit 12.

At step S201, the intermediate model generation unit 12 acquires one unapplied intermediate model generation rule (hereinafter referred to as a "target rule") among the plurality of intermediate model generation rules, from the generation rule DB 16 as an application target. The plurality of intermediate model generation rules are applied to different application positions (application portions) of the old system model, respectively. In other words, the old system model is not necessarily expressed in a unified data format through the whole. For example, a data format after conversion to the old system model may differ according to the classifications described above. Therefore, for example, the intermediate model generation rules may be created for each of the classifications described above.

Next, the intermediate model generation unit 12 applies the target rule to a position (a portion) corresponding to the target rule in the old system model to generate a portion of an intermediate model corresponding to the portion, and stores the portion of the intermediate model into the model DB 17 (S202).

The intermediate model generation rules are data in which rules as shown below are defined. The rules as shown below are rules for extracting parameters as shown below from the old system model to generate a model (data) that includes the parameters, as an intermediate model in a form independent of a particular implementation technique, and generating intermediate model generation information about the intermediate model. Here, the parameters as shown below refers to parameters related to a static data structure, algorithms of processes, a GUI and screen transitions. Then, the intermediate model generation rules are created by a person who understands the implementation of the old system.

Next, the intermediate model generation unit 12 generates intermediate model generation information that includes the target rule, the position (the portion) of the old system model to which the target rule is applied and the position (the portion) of the intermediate model generated as a result, based on the target rule and stores the intermediate model generation information into the model generation information DB 18 (S203). In other words, the intermediate model generation information is information showing a correspondence relationship between the position (the portion) of the old system model and the position (the portion) of the intermediate model, and showing by what conversion process the position of the intermediate model has been generated. As fir "what conversion process", it is expressed by the target rule. Note that, here, the position (the portion) of the intermediate model refers to a position (a portion) of the intermediate model when a set as shown below is grasped as one intermediate model. Here, the set as shown below refers to a set of portions of the intermediate model generated by all the intermediate model generation rules. In other words, each intermediate model generation rule generates a portion of the intermediate model that is finally generated. Therefore, the position (the portion) is the portion of the intermediate model generated at step S202. Note that data formats of the positions (the portions) of the intermediate model may be mutually different.

When steps S201 to S203 have been executed for all the intermediate model generation rules (S204: Yes), the intermediate model generation unit 12 ends the process.

Figure 6:
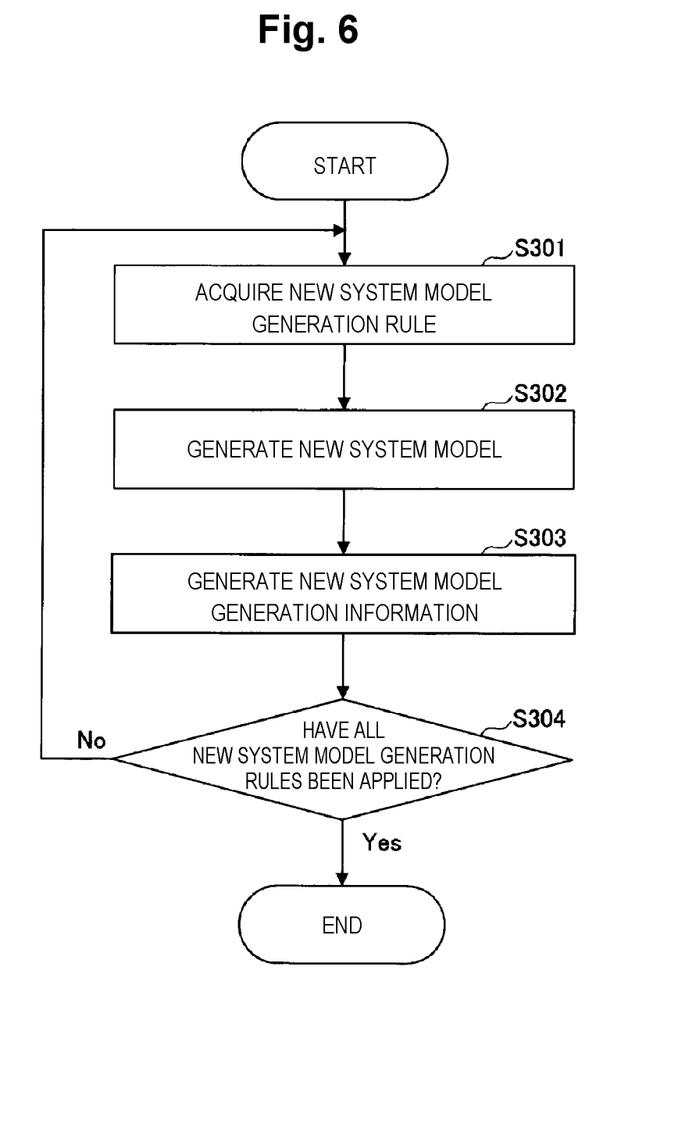
FIG. 6 is a flowchart for illustrating an example of a processing procedure executed by a new system model generation unit 13.

FIG. 6 is a flowchart for illustrating an example of a processing procedure executed by the new system model generation unit 13.

At step S301, the new system model generation unit 13 acquires one unapplied new system model generation rule (hereinafter referred to as a "target rule") among the plurality of new system model generation rules, from the generation rule DB 16 as an application target. The plurality of new system model generation rules are applied to different application positions (application portions) of the intermediate model, respectively. In other words, the intermediate model is not necessarily expressed in a unified data format through the whole. For example, a data format after conversion to the intermediate model may differ according to the classifications described above. Therefore, for example, the new system model generation rules may be created for each of the classifications described above.

Next, for each of the intermediate model and the intermediate model generation information, the new system model generation unit 13 applies the target rule to the position (the portion) corresponding to the target rule to generate a portion of a new system model, and stores the portion of the new system model into the model DB 17 (S302).

The new system model generation rules are data in which rules as shown below are defined. Here, the rules as shown below refers to rules for determining a configuration of the new system, a used API and the like according to information as shown below and generating a model holding them as parameters as the new system model. Here, the information as shown below refers to a static data structure of the intermediate model, algorithms of processes, a GUI, various kinds of parameters related to screen transition, and implementation details of the intermediate model recorded as the intermediate model generation information in the old system. Here, the implementation details in the old system refers to the static data structure, algorithms of processes, GUI and parameters related to screen transitions of the old system model. The new system model generation rules are created by a person who understands the implementation of the old system and the implementation of the new system. In other words, based on the position (the portion) corresponding to the target rule in the intermediate model generation information, the new system model generation unit 13 identifies a position corresponding to the target rule in the old system model. The new system model generation unit 13 generates a portion of the new system model based on the position (the portion) corresponding to the target rule in the intermediate model and the position (the portion) corresponding to the target rule in the old system model. Here, by not only the intermediate model but also the position (the portion) corresponding to the target rule in the old system model being directly referred to (traced) based on the intermediate model generation information, details of the implementation information about the old system, which is missed in the conventional technique, can be reflected on the new system model. For example, the API name and the like dependent on the implementation technique of the old system can be converted to an API name and the like dependent on the implementation technique of the new system.

Next, the new system model generation unit 13 generates new system model generation information that includes the target rule, the position (the portion) of the intermediate model to which the target rule is applied and the position (the portion) of the new system model generated as a result, based on the target rule and stores the new system model generation information into the model generation information DB 18 (S303). In other words, the new system model generation information is information showing a correspondence relationship between the position (the portion) of the intermediate model and the position (the portion) of the new system model, and showing by what conversion process the position (the portion) of the new system model has been generated. As for "what conversion process", it is expressed by the target rule. Note that, here, the position (the portion) of the new system model refers to a position (a portion) of the new system model when a set as shown below is grasped as one new system model. Here, the set as shown below refers to a set of portions of the new system model generated by all the new system model generation rules. In other words, each new system model generation rule generates a portion of the new system model that is finally generated. Therefore, the position (the portion) is the portion of the new system model generated at step S302. Note that data formats of the positions (the portions) of the new system model may be mutually different.

When steps S301 to S303 have been executed for all the new system model generation rules (S304: Yes), the new system model generation unit 13 ends the process.

Figure 7:
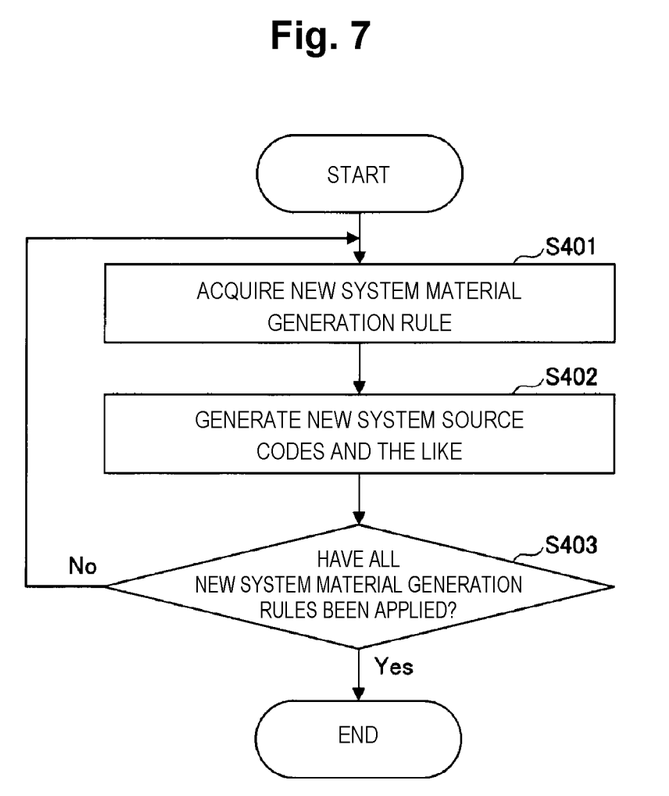
FIG. 7 is a flowchart for illustrating an example of a processing procedure executed by a material generation unit 14.

FIG. 7 is a flowchart for illustrating an example of a processing procedure executed by the material generation unit 14.

At step S401, the material generation unit 14 acquires one unapplied new system material generation rule (hereinafter referred to as a "target rule") among the plurality of new system material generation rules, from the generation rule DB 16 as an application target. The plurality of new system material generation rules are applied to different application positions (application portions) of the new system model, respectively. In other words, the new system model is not necessarily expressed in a unified data format through the whole. For example, a data format after conversion to the new system model may differ according to the classifications described above. Therefore, for example, the new system material generation rules may be created for each of the classifications described above.

Next, the material generation unit 14 applies the target rule to a position (a portion) corresponding to the target rule in the new system model to generate a portion of each of source files (source codes) and setting files of the new system (S402). The generated portion of each of the source files and setting files is stored into the auxiliary storage device 102 or the like.

The new system material generation rules refers to data in which rules for generating the content of the source files and setting files of the new system as character strings, using information about configurations of the source files and the setting files held by the new system model and the used API are defined. The material generation unit 14 outputs the generated character strings as source files or setting files of the new system using information such as the file names, the file paths and the like held by the new system model.

When steps S401 and S402 have been executed for all the new system material generation rules (S403: Yes), the material generation unit 14 ends the process.

Figure 8:
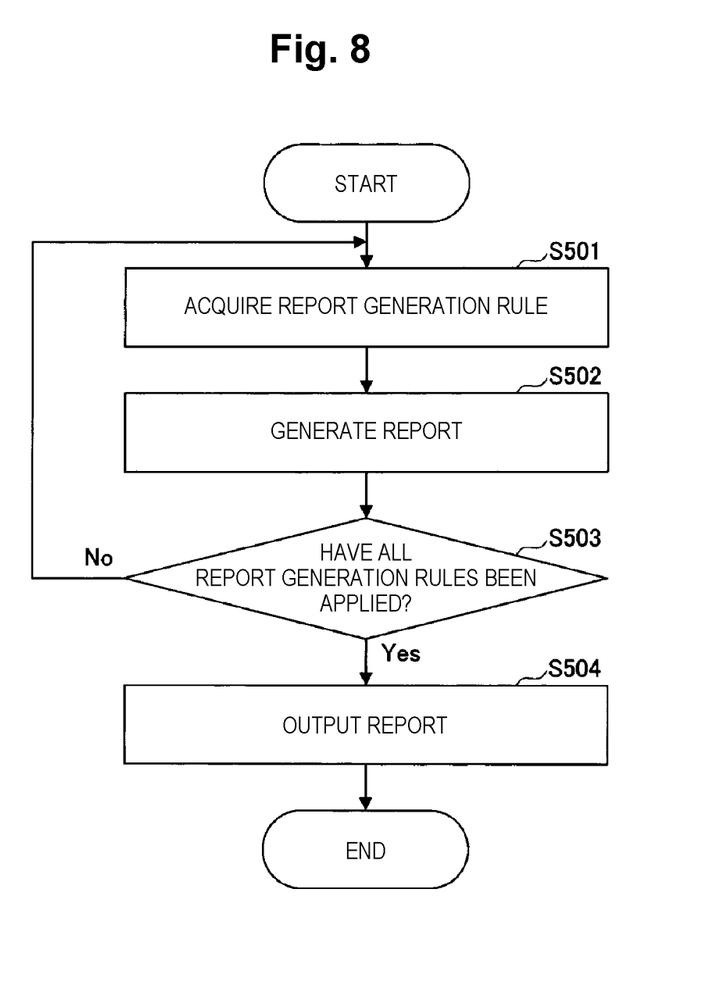
FIG. 8 is a flowchart for illustrating an example of a processing procedure executed by a report generation unit 15.

FIG. 8 is a flowchart for illustrating an example of a processing procedure executed by the report generation unit 15.

At step S501, the report generation unit 15 acquires one unapplied report generation rule (hereinafter referred to as a "target rule") among the plurality of report generation rules, from the generation rule DB 16 as an application target. The plurality of report generation rules are applied to different application positions (application portions) of the new system model generation information, respectively. In other words, the new system model generation information is not necessarily expressed in a unified data format through the whole. For example, a data format after conversion to the new system model generation information may differ according to the classifications described above. Therefore, for example, the report generation rules may be created for each of the classifications described above.

Next, the report generation unit 15 applies the target rule to the positions (the portions) corresponding to the target rule in the new system model generation information and the intermediate model generation information stored in the model generation information DB 18 to generate a portion of a report (S502).

The report generation rules refers to data in which rules for generating a report as shown below are defined. Here, the report as shown below refers to a report that includes information showing correspondence relationships between (the portions of) the new system and (the portions of) the old system, and information about content of work and an estimated amount of work at the time of manually complementing the source files and setting files of the new system, based on three pieces of information as shown below. The first piece of information is positions (portions) of the intermediate model that are generation sources of the portions of the new system model, which are included in the new system model generation information, and new system model generation rules applied to the positions (the portions) of the intermediate model. The second piece of information is positions (portions) of the old system model that are generation sources of the positions (the portions) of the intermediate model. The third piece of information is intermediate model generation rules applied to the positions (the portions) of the old system model. The report generation rules are created by a person who understands the implementation of each of the old system and the new system.

At step S502, a correspondence relationship between the position (the portion) corresponding to the target rule in the new system model and the position (the portion) corresponding to the target rule in the old system model is identified. The position (the portion) corresponding to the target rule in the old system model can be identified by referring to the position (the portion) in the intermediate model generation information identified based on the position (the portion) corresponding to the target rule in the new system model generation information. In other words, the position (the portion) of the intermediate model generation information includes information showing a position (a portion) of the old system model to which intermediate model generation information corresponding to the position (the portion) of the intermediate model corresponding to the position (the portion) is applied.

When steps S501 and S502 have been executed for all the report generation rules (S503: Yes), the report generation unit 15 integrates portions of reports and outputs them as a file (S504).

As described above, according to the present embodiment, when an intermediate model is generated, intermediate model generation information showing a correspondence relationship between the intermediate model and an old system model is generated. Then, when a new system model is generated, the new system model can be generated, using the correspondence relationship between the intermediate model and the old system model identified based on the intermediate model generation information. Therefore, it is possible to enhance reproducibility of operation of a migration source system in a migration destination system.

Further, by a report showing a correspondence relationship between the old system model and the new system model and the like being outputted, increase in efficiency of complementary work that is manually performed can be expected.

Note that, in the present embodiment, the old system model is an example of first data. The intermediate model is an example of second data. The intermediate model generation information is an example of first correspondence information. The new system model is an example of third data. The new system model generation information is an example of second correspondence information. The old system analysis unit 11 is an example of a first generation unit. The intermediate model generation unit 12 is an example of a second generation unit. The new system model generation unit 13 is an example of a third generation unit. The report generation unit 15 is an example of a fourth generation unit.

An embodiment of the present invention has been described in detail above. The present invention is, however, not limited to such a particular embodiment, and various modifications and changes are possible within a scope of the spirit of the present invention described in Claims.

REFERENCE SIGNS LIST

10 System migration support apparatus
11 Old system analysis unit
12 Intermediate model generation unit
13 New system model generation unit
14 Material generation unit
15 Report generation unit
16 Generation rule DB
17 Model DB
18 Model generation information DB
100 Drive device
101 Recording medium
102 Auxiliary storage device
103 Memory device
104 CPU
105 Interface device
B Bus

The invention claimed is:

1. A system migration support apparatus comprising:
a first rule generator configured to generate first data showing information about operation of a migration source system in a form dependent on an implementation technique of the migration source system, based on materials of the migration source system;
a second rule generator configured to generate second data showing the information about the operation in a form independent of a particular implementation technique, based on the first data, and generating first correspondence information showing correspondence relationships between portions of the first data and portions of the second data; and
a third rule generator configured to identify the portions of the first data corresponding to the portions of the second data, referring to the first correspondence information, and generating third data showing the information about the operation in a form dependent on an implementation technique of a migration destination system, based on the identified portions, wherein the third rule generator configured to generate second correspondence information showing correspondence relationships between the portions of the second data and portions of the third data, and the migration support apparatus comprises a fourth rule generator configured to generate information showing a correspondence relationship between the migration destination system and the migration source system, based on the second correspondence information and the first correspondence information.

2. A system migration support method, comprising:

generating, by a first rule generator, first data showing information about operation of a migration source system in a form dependent on an implementation technique of the migration source system, based on materials of the migration source system;

generating, by a second rule generator, second data showing the information about the operation in a form independent of a particular implementation technique, based on the first data, and generating first correspondence information showing correspondence relationships between portions of the first data and portions of the second data; and identifying, by a third rule generator, the portions of the first data corresponding to the portions of the second data, referring to the first correspondence information, and generating third data showing the information about the operation in a form dependent on an implementation technique of a migration destination system, based on the identified portions, wherein the generation procedure by the third rule generator generates second correspondence information showing correspondence relationships between the portions of the second data and portions of the third data, and the method further comprising generating, by a fourth rule generator, information showing a correspondence relationship between the migration destination system and the migration source system, based on the second correspondence information and the first correspondence information.

3. A non-transitory computer-readable recording medium having computer-executable instructions stored thereon, which when executed, causes a computer including a memory and a processor to:

generate, by a first rule generator, first data showing information about operation of a migration source system in a form dependent on an implementation technique of the migration source system, based on materials of the migration source system;

generate, by a second rule generator, second data showing the information about the operation in a form independent of a particular implementation technique, based on the first data, and generating first correspondence information showing correspondence relationships between portions of the first data and portions of the second data; and identify, by a third rule generator, the portions of the first data corresponding to the portions of the second data, referring to the first correspondence information, and generating third data showing the information about the operation in a form dependent on an implementation technique of a migration destination system, based on the identified portions, wherein the third rule generator generates second correspondence information showing correspondence relationships between the portions of the second data and portions of the third data, and the computer-executable instructions when executed further causing the system to:

generate, by a fourth rule generator, information showing a correspondence relationship between the migration destination system and the migration source system, based on the second correspondence information and the first correspondence information.

4. The system migration support apparatus according to claim 1, wherein the first data include a source code file associated with processes executed by the migration source system.

5. The system migration support apparatus according to claim 1, wherein the information about the operation in a form independent of a particular implementation technique includes a graphical user interface and screen transitions.

6. The system migration support apparatus according to claim 1, wherein the first correspondence information is based on one or more rules for generating the second data.

7. The system migration support apparatus according to claim 1, wherein the third data include implementation information about the migration source system based on the first corresponding information.

8. The system migration support apparatus according to claim 1, wherein the generating the third data includes converting a name of an Application Programming Interface (API) from the migration source system to another name based on the implementation technique of the migration destination system.

9. The system migration support method according to claim 2, wherein the first data include a source code file associated with processes executed by the migration source system.

10. The system migration support method according to claim 2, wherein the information about the operation in a form independent of a particular implementation technique includes a graphical user interface and screen transitions.

11. The system migration support method according to claim 2, wherein the first correspondence information is based on one or more rules for generating the second data.

12. The system migration support method according to claim 2, wherein the third data include implementation information about the migration source system based on the first corresponding information.

13. The system migration support method according to claim 2, wherein the generating the third data includes converting a name of an Application Programming Interface (API) from the migration source system to another name based on the implementation technique of the migration destination system.

14. The non-transitory computer-readable recording medium according to claim 3, wherein the first data include a source code file associated with processes executed by the migration source system.

15. The non-transitory computer-readable recording medium according to claim 3, wherein the first correspondence information is based on one or more rules for generating the second data.

16. The non-transitory computer-readable recording medium according to claim 3, wherein the third data include implementation information about the migration source system based on the first corresponding information.

17. The non-transitory computer-readable recording medium according to claim 3, wherein the generating the third data includes converting a name of an Application Programming Interface (API) from the migration source system to another name based on the implementation technique of the migration destination system.

\* \* \* \* \*